(No Model.)
J. S. PIPER.
WAGON ATTACHMENT.
No. 492,049.  Patented Feb. 21, 1893.
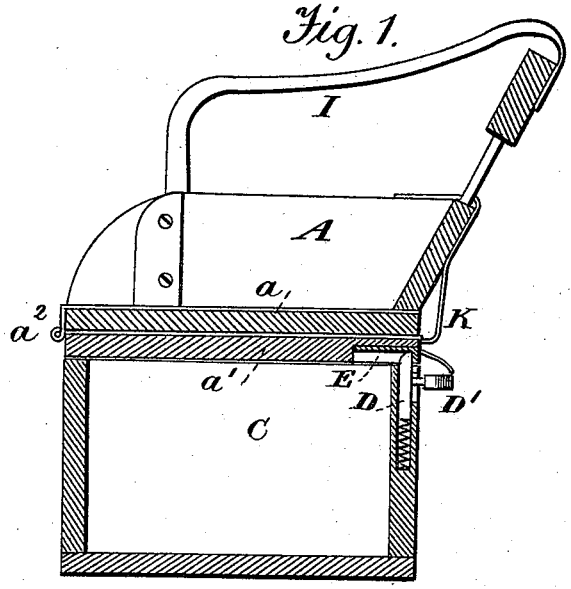
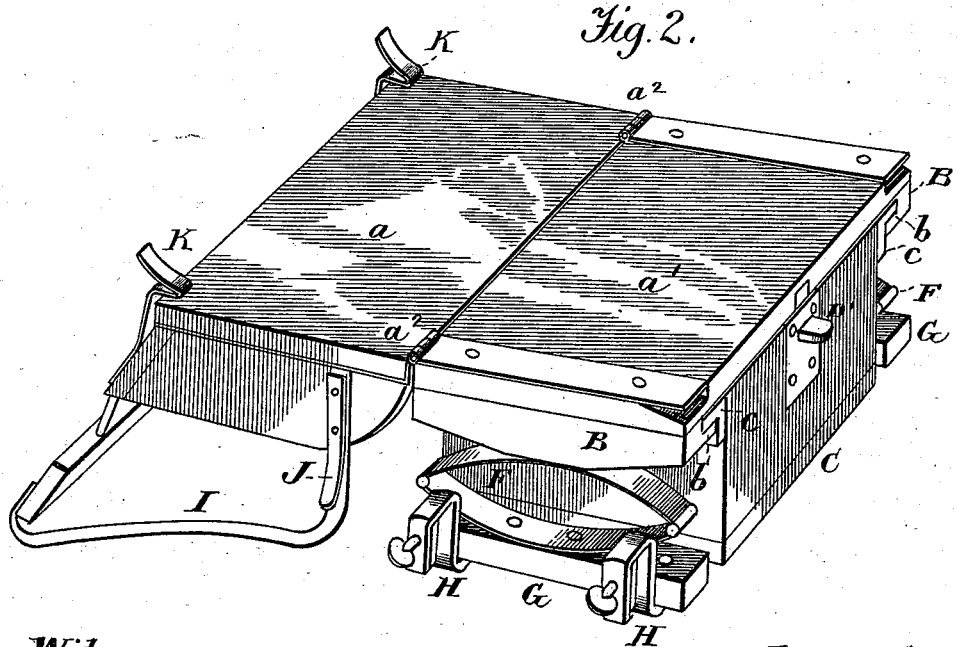
Witnesses.
A. Ruppert
G. B. Fowler
Inventor.
John S. Piper
Per
Thomas R. Simpson
Atty

UNITED STATES PATENT OFFICE.

JOHN S. PIPER, OF WINTERS, TEXAS.

WAGON ATTACHMENT.

SPECIFICATION forming part of Letters Patent No. 492,049, dated February 21, 1893.

Application filed November 8, 1892. Serial No. 451,335. (No model.)

*To all whom it may concern:*

Be it known that I, JOHN S. PIPER, a citizen of the United States of America, residing at Winters, in the county of Runnels and State of Texas, have invented certain new and useful Improvements in Wagon Attachments, of which the following is a specification, reference being had therein to the accompanying drawings.

The invention relates to market wagons or carts in which butter, eggs or any salable commodity is conveyed.

The invention consists in certain improvements connected with the wagon seat as hereinafter described and pointed out in the claims.

Figure 1 is a vertical section of my wagon attachment, and Fig. 2 a perspective view thereof.

In the drawings, A represents the wagon seat which has the two bottoms $a\, a'$ of corresponding dimensions and hinged together in front at $a^2\, a^2$ so that the seat-bottom $a$ may be turned over to form a table on which may be displayed, upon a street or before a market house, any agricultural product or other commodity which the driver may have for sale. To the bottom of the seat are attached the end-pieces B B rabbeted at $b\, b$ to form grooves in which may be slid the tenons $c\, c$, of a box C, the latter being provided with a spring-catch D which works up and down between two pendent lips E E on the underside and edge of the seat-bottom $a'$. By pushing down the thumb piece $D'$, the box or drawer C may be taken out behind the wagon or slid back far enough to allow anything to be taken out from the inside. To the underside of the seat bottom $a'$, and of the endpieces B B, I attach elliptic springs F F and to the underside of these secure the bars G G which may be readily affixed to the wagon bed by the screw clamps H H. I may hold bottoms $a\, a'$ together by spring catches K. K. On the side of the seat-arms I I are secured the vertical springs J J, the reins being easily retained with sufficient tenacity to prevent the horse or horses from moving off with the vehicle.

Having thus described all that is necessary to a full understanding of my invention, what I claim as new, and desire to protect by Letters Patent, is—

1. A wagon or cart attachment consisting of a forwardly folding, double-bottomed seat, the subjacent endpieces B B, elliptic springs F F, and bars G G under the springs; whereby is formed a combined seat and table supported on springs and readily attachable to or detachable from the wagon as described.

2. The combination of the rigid bottom $a'$, rabbeted bars B B, and side-tenoned box C as shown and described.

3. The combination with the seat-arms I I of the vertical springs J J made fast thereto at the lower end as and for the purpose specified.

In testimony whereof I affix my signature in presence of two witnesses.

JOHN S. PIPER.

Witnesses:
    F. J. STOCKS,
    A. F. ADAMS.